(12) United States Patent
Turbe (10) Patent No.: US 10,326,115 B2
(45) Date of Patent: Jun. 18, 2019

(54) MEANS FOR WEDGING AN ELECTROCHEMICAL GENERATOR IN POSITION IN A BATTERY

(71) Applicant: SAFT GROUPE SA, Bagnolet (FR)

(72) Inventor: Benoît Turbe, Bassens (FR)

(73) Assignee: SAFT, Bagnolet (FR)

( * ) Notice: Subject to any disclaimer, the term of this patent is extended or adjusted under 35 U.S.C. 154(b) by 164 days.

(21) Appl. No.: 15/318,910

(22) PCT Filed: Jun. 16, 2015

(86) PCT No.: PCT/EP2015/063467
§ 371 (c)(1),
(2) Date: Dec. 14, 2016

(87) PCT Pub. No.: WO2015/193307
PCT Pub. Date: Dec. 23, 2015

(65) Prior Publication Data
US 2017/0149033 A1 May 25, 2017

(30) Foreign Application Priority Data

Jun. 16, 2014 (FR) .................................. 14 55488

(51) Int. Cl.
| | |
|---|---|
| *F16B 3/00* | (2006.01) |
| *H01M 2/10* | (2006.01) |
| *H01M 2/18* | (2006.01) |
| *H01M 2/14* | (2006.01) |
| *H01M 10/04* | (2006.01) |

(52) U.S. Cl.
CPC ........... *H01M 2/1016* (2013.01); *F16B 3/005* (2013.01); *H01M 2/10* (2013.01); *H01M 2/14* (2013.01); *H01M 2/18* (2013.01); *H01M 10/049* (2013.01)

(58) Field of Classification Search
CPC ........ H01M 2/1016; H01M 2/18; H01M 2/14; H01M 10/049; H01M 2/10; F16B 3/005
See application file for complete search history.

(56) References Cited

U.S. PATENT DOCUMENTS

| 4,019,630 A | 4/1977 | Plaisted | |
|---|---|---|---|
| 2008/0203263 A1* | 8/2008 | Carnevali | B60R 11/00 248/346.2 |
| 2015/0017502 A1* | 1/2015 | Brenner | F16B 3/005 429/99 |

FOREIGN PATENT DOCUMENTS

| EP | 1 199 344 A1 | 4/2002 |
|---|---|---|
| WO | 2008/103220 A1 | 8/2008 |
| WO | 2013/120770 A1 | 8/2013 |

OTHER PUBLICATIONS

International Search Report for PCT/EP2015/063467 dated Sep. 1, 2015 [PCT/ISA/210].
Written Opinion for PCT/EP2015/063467 dated Sep. 1, 2015 [PCT/ISA/237].

* cited by examiner

*Primary Examiner* — Stewart A Fraser
(74) *Attorney, Agent, or Firm* — Sughrue Mion, PLLC (57) ABSTRACT

Seal (3) comprising at least two deformable shells (1,1'), each one of the shells containing a component and comprising a membrane, characterized in that bringing the component contained in one shell (1) into contact with the component contained in another shell (1') causes the mixture of the components to crosslink. Use of the seal for wedging electrochemical generators in position in a battery, particularly lithium generators.

13 Claims, 6 Drawing Sheets

MEANS FOR WEDGING AN ELECTROCHEMICAL GENERATOR IN POSITION IN A BATTERY

CROSS REFERENCE TO RELATED APPLICATIONS

This application is a National Stage of International Application No. PCT/EP2015/063467 filed Jun. 16, 2015, claiming priority based on French Patent Application No. 1455488 filed Jun. 16, 2014, the contents of all of which are incorporated herein by reference in their entirety.

TECHNICAL FIELD

The technical field of the invention is that of means for wedging electrochemical generators in a battery. The present invention proposes a seal for wedging electrochemical generators in a battery, in particular a lithium electrochemical generator. The technical field is also that of methods for manufacturing a battery.

STATE OF THE ART

An electrochemical generator is a device for producing electricity in which chemical energy is converted into electric energy. The chemical energy is constituted by electrochemical active compounds deposited on at least one face of electrodes positioned in the electrochemical generator. The electric energy is produced by electrochemical reactions during a discharge of the electrochemical generator. The electrodes, positioned in a container, are electrically connected to current output terminals which ensure electric continuity between the electrodes and an electric consumer with which the electrochemical generator is associated. The positive and negative current output terminals may be attached either on the walls of opposite faces of the container of the electrochemical generator, or on the wall of a same face of the container.

Several electrochemical generators may be connected together in series or in parallel depending on the rated operating voltage of the electric consumer and on the amount of energy which is intended to be provided to this consumer. The electrochemical generators are then placed in a common casing, also called a tray, and the whole of the casing and of the plurality of electrochemical generators which it contains is generally designated by the term of battery. For the sake of convenience for electric connection between electrochemical generators placed in a battery, the positive and negative current output terminals are often attached on the wall of a same face of the container.

In the absence of wedging, when a battery is subject to mechanical stresses, such as vibrations or impacts, the electrochemical generators randomly move in the battery tray. These displacements cause strong stresses which may cause degradations or breakages of the components of the battery, or even of the actual electrochemical generators.

The wedging of electrochemical generators is presently accomplished with different mechanical solutions, notably with the purpose of mechanically blocking the generators in their relative displacements with respect to the battery tray.

Document GB 938,359 describes a battery of electrochemical generators comprising a tray in which is positioned a plurality of electrochemical generators. The holding of the generators is ensured by the use of a foam or resin which fills the space between the electrochemical generators.

Wedging by injecting an expansive or non-expansive resin requires a particular infrastructure and particular pieces of equipment. The duration for manufacturing such a battery is not very compatible with the production on an industrial scale. Further, a large amount of resin is required in order to be able to wedge all the generators of a battery. This large amount of resin makes the battery heavier.

Another solution today proposed for wedging electrochemical generators within a battery consists in the use of an elastomeric polymer ring which is more or less deformable, as described in document EP 2 403 050. The deformable property of the polymeric ring causes that when vibrating, the system formed by the battery comprising the polymeric ring induces low frequency vibrational eigenmodes which is a penalty for the mechanical structure. Indeed, the elastomeric polymer ring remains flexible, even after assembling the electrochemical generators of the battery.

Document WO 2013/120770 describes a tray containing a plurality of electrochemical generators. The generators are wedged in this tray by means of an attachment element which contains a curable filling material. This attachment element is hollow and deformable. It may expand in the case of an increase in the internal pressure, before curing of the filling material.

In this document, the attachment element is placed between the electrochemical generators. This positioning of the attachment element does not give the possibility of guaranteeing wedging of the electrochemical generator on the whole of the periphery of the container of the electrochemical generator since the whole periphery of the container is not in contact with the attachment element. Further, certain portions of the attachment element are not in contact with the container of the generator. The solution proposed in this document therefore does not allow rigid wedging/blocking of the generator with regard to the tray both along a radial direction and an axial direction.

Further, this positioning of the attachment element does not give the possibility of clearing a space under the bottom of the container of the generator. Such a space is necessary when a safety system is located on the bottom of the container of the generator. Such a safety system is for example described in FR 2 873 495. In document WO 2013/120770, the electrochemical generators directly rest on the bottom of the tray and there is no space giving the possibility of receiving the released gases of the generator during the triggering of the safety system.

The present invention therefore aims at providing a mechanical means for wedging the electrochemical generators, which surmounts the drawbacks above.

SUMMARY OF THE INVENTION

For this purpose, the present invention proposes a seal comprising at least two deformable shells, characterized in that each shell contains a component and comprises a sealing film and in that the contacting of the component contained in a shell with the component contained in another shell causes cross-linking of the mixture of both components.

According to an embodiment of the invention, the component contained in a shell is a base composition and the component contained in the other shell is a hardener composition, the base composition and the hardener composition being the components of a two-component adhesive.

According to an embodiment of the invention, the shells are attached to each other by welding, preferably by vulcanization, by ultrasound or by adhesive bonding.

According to an embodiment of the invention, the contacting of the components contained in each shell is carried out after breaking the sealing films of each shell.

According to an embodiment of the invention, under the action of a mechanical stress, the sealing films break and the components contained in each shell are contacted to obtain the cross-linking.

According to an embodiment of the invention, the cross-linking of the components results in a resin selected from among polyepoxides, polyvinyl esters, polyacrylics, polyacrylates or mixtures thereof.

According to an embodiment of the invention, the seal has an empty space between said shells.

According to an embodiment of the invention, the seal has the shape of a ring in which each shell represents a portion of the ring.

According to an embodiment of the invention, the seal consists of two shells, each of both shells having the shape of a half-ring.

According to an embodiment of the invention, each shell comprises an end having a male portion and an end having a female portion, the male portion of the end of one of the shells being inserted into the female portion of the end of another shell.

According to an embodiment of the invention, the end of the male portion is closed by a sealing film and the male portion comprises a means for breaking the sealing film.

The present invention also proposes a method for manufacturing the seal according to the invention, comprising the following steps:
a) providing at least two deformable shells,
b) filling each shell with a component,
c) placing at least one sealing film on each shell,
the order of steps b) and c) may be reversed.

According to an embodiment of the invention, the method further comprises a step for welding the shells to each other, so that a breakage of the sealing film causes the contacting of the component contained in a shell with the component contained in another shell.

The present invention also proposes a wedging means obtained after cross-linking of the components of the seal according to the invention.

The present invention also proposes the use of the seal according to the invention, for wedging at least one electrochemical generator in the battery tray.

The present invention also proposes a method for assembling a battery comprising at least one electrochemical generator, said method comprising the following steps:
making available a tray comprising a supporting surface,
setting into place at least one seal according to the invention in the tray in contact with the supporting surface,
setting into place at least one electrochemical generator in contact with the seal,
breaking the sealing films and contacting the components contained in the shells of the seal under the action of the mechanical stress exerted by the electrochemical generator,
stiffening of the seal.

The electrochemical generator comprises a container including a bottom, and preferably the bottom of the container is in contact with the seal.

The invention also proposes a battery comprising at least one electrochemical generator and at least one wedging means according to the invention.

The invention also proposes a method for assembling a battery comprising at least one electrochemical generator, said method comprising the steps:
making available a tray comprising a supporting surface,
setting into place in the tray at least one seal able to be stiffened in contact with the supporting surface,
setting into place at least one electrochemical generator in contact with the seal,
stiffening the seal under the action of the mechanical stress exerted by the electrochemical generator.

The seal according to the present invention is lightweight, which represents a gain in mass as compared with filling with foam.

The seal according to the present invention may be easily integrated on different designs of electrochemical generators and of batteries.

The seal according to the present invention may be implanted in production, on an industrial scale.

The seal according to the present invention gives the possibility of obtaining a battery which is robust, which notably withstands vibrations and impacts which a battery may undergo.

The seal according to the invention, after curing forms a wedging means. By being crushed, the seal according to the invention may fill all the assembling plays between an object to be wedged and its receiving part, for example between an electrochemical generator and a supporting surface, such as the bottom of the tray or a mechanical supporting element laid on the bottom of the battery tray.

The seal according to the invention is self-sufficient, i.e. it is initiated during the assembling.

The compression of the seal between the electrochemical generator and its supporting surface forces its shell to enter the residual plays of the assembly in order to fill these plays in a flexible way in a first phase. When the seal undergoes a mechanical stress, such as crushing, the sealing films separating the components of the shells, such as the base compositions and the hardener compositions break and the components contained in the shells mix together. After mixing, the resin then begins its cross-linking process or even an emulsion process.

The thereby produced resin is distributed in the volume of its shell now fitting the residual plays between the electrochemical generator and its supporting surface. After cross-linking, a stiff seal is obtained (also designated by the expression "wedging means"). Once the cross-linking and optionally the emulsion is completed, the resin is hard and the seal is deformed so as to produce rigid wedging adapted between each electrochemical generator and its supporting surface.

DISCUSSION OF EMBODIMENTS

The invention firstly relates to a seal comprising at least two deformable shells.

According to an embodiment, the seal consists of two, three or four deformable shells. Preferably, the seal consists of two or four deformable shells, still preferably two deformable shells.

The deformable shell comprises at least one sealing film and contains a component.

In the sense of the present invention, by "sealing film" is meant a fragile membrane which may easily be broken under the action of a mechanical stress, such as crushing or compression. The sealing film may be a material selected from among aluminium, paper or plastics, such as synthetic rubbers. The sealing film may be laid and attached on the shell by vulcanization or by high frequency welding. The sealing film preferably has a thickness ranging from 3 to 10 times smaller than the thickness of the membrane of the shell, preferably of the order of 5 times smaller. One skilled in the art will be able to adapt the material of the sealing film depending on the material of the shell. As an example, it is possible to use a rubber shell, like in synthetic rubber, and a sealing film in rubber, such as a synthetic rubber, the sealing film having a smaller thickness than the thickness of the membrane of the shell.

In the sense of the present invention, by "shell" is meant a hollow body having a certain volume which may contain a component which may be in liquid or solid form. The shell according to the invention comprises at least one aperture allowing it to be filled with a component and allowing its closing by at least one sealing film.

The shells according to the invention comprise at least one sealing film, i.e. that at least one portion of the membrane forming the shell is fragile and is designated by the term of sealing film. Excepted the sealing film, the membrane of the shell is not fragile. i.e. the membrane of the shell cannot break by a simple mechanical stress, such as crushing or pressure. The material of the shell is adapted to the deformation which the shell may undergo, notably to the deformation due to the cross-linking of the mixture of the components contained in the shells. It deforms but does not break under the effect of the cross-linking of the mixture, nor under the effect of an increase in the volume of the mixture.

By "deformable" shell, is meant a shell for which the shape and/or the volume may be modified. Indeed, within the seal according to the invention, the components contained in the shells are able to be contacted for causing the cross-linking of the mixture of the components.

By "deformable" shell is meant a shell for which the shape and/or the volume may be modified. Indeed, within the seal according to the invention, the components contained in the shells are able to be contacted in order to cause cross-linking of the mixture of the components.

Under the action of a mechanical stress which may occur upon setting into place an electrochemical generator on the seal according to the invention placed in contact with a supporting surface, such as the bottom of a battery tray or a supporting element laid on the bottom of the battery tray, the sealing films break and the components present in each of the shells are contacted so as to cause cross-linking, or even an emulsion during which the resin, consisting of the mixture of the two components, is distributed and may optionally increase its volume. Thus, by means of the deformable structure of the shells, the resin adapts to its environment and fills the empty spaces. After cross-linking and/or emulsion, the resin which is maintained in the seal is hard. The seal is then deformed and rigid, which gives the possibility of mechanically wedging an element in the receiving part, such as an electrochemical generator in the battery tray.

Preferably, the deformable shells are formed with materials having a Young modulus of less than or equal to 150 GPa, preferably less than or equal to 125 GPa, still preferably less than or equal to 100 GPa.

Preferably, the membrane of the shell has a thickness ranging from 0.25 to 1.50 mm, preferably from 0.30 to 1.25 mm, still preferably from 0.40 to 1.00 mm.

Preferably, the membrane of the shell is a material selected from among natural or synthetic rubbers, silicones, fluorosilicones, neoprene, polysulfides, butadiene-acrylonitrile.

The rubber may be a natural rubber for example obtained from the rubber tree or a synthetic rubber which may be obtained by polymerization of isoprene.

The material of the shell may be adapted according to the resin which will be obtained after cross-linking of the mixture of the components, depending on the capability or not of the resin of increasing volume during its cross-linking. Indeed, in the case when the resin will not increase its volume, the shell should not necessarily have the capability of increasing the volume. In this case, it will be sufficient that the shell may modify its shape in order to adapt to the expansion of the resin (without any volume modification). On the other hand, in the case when the resin will increase in volume, the shell should have the capability of increasing the volume, in addition to the capability of modifying its shape for adapting to the expansion of the resin (with increase in volume).

Preferably, at least 50% of the volume of the shell is filled with the component, preferably at least 75% of the volume of the shell, preferably the totality of the volume of the shell is filled with the component.

According to an embodiment, the component contained in one of the two shells is a base composition and the component contained in the other shell is a hardener composition. The components of a two-component adhesive are designated by "base composition" and "hardener composition". Within the seal according to the invention, the composition of the base and the composition of the hardener are selected so that the mixture of the composition of the base with the composition of the hardener causes cross-linking of the mixture.

The composition of the base comprises at least one polymer and the composition of the hardener comprises at least one cross-linking agent, the cross-linking agent being able to cause cross-linking of the polymer.

Preferably, the composition of the base comprises at least one cross-linkable polymer, preferably selected from among epoxys, polyacrylics, polyacrylates, polyvinyl esters, or a mixture thereof.

One skilled in the art knows which type of hardener may be used for causing cross-linking of a base composition as described above.

Preferably, the composition of the hardener comprises at least one cross-linking agent selected from among anhydrides, carboxylic acids, amine compounds, phenolic compounds, polyols, polyamides, isocyanate compounds, peroxides, such as organic peroxides.

As an example, when the composition of the base comprises an epoxy, the composition of the hardener will preferably comprise a compound selected from among anhydrides, carboxylic acids, amine compounds, phenolic compounds, polyols, or mixtures thereof. When the composition of the base comprises a polyacrylate and/or polyacrylic base, the composition of the hardener will preferably comprise a compound selected from among isocyanates, peroxides or mixtures thereof. When the base composition comprises a polyvinyl ester, the hardener composition will preferably comprise a compound selected from among vinyl monomers, peroxides, preferably organic peroxides.

Preferably, the shells present in the seal according to the invention are positioned in such a way that, when a mechanical stress is applied, the breakage of a sealing film of a shell gives the possibility of contacting the component contained in said shell with the component contained in the other shell then causing cross-linking of the mixture of the components.

At rest, i.e. before applying a mechanical stress, the composition of the base and the composition of the hardener are maintained in two shells, without any possible contact between the component contained in one shell and the component contained in another shell. In other words, at rest, the components are not cross-linked. It is under the action of a mechanical stress that the sealing films of the shells break, which causes contacting of the components; the composition of the base and the composition of the hardener mix together. The mixture of both components causes cross-linking of the resin.

Preferably, the cross-linking of the mixture of the components contained in the shells results in a resin selected from among polyepoxides, polyvinyl esters, polyacrylics, polyacrylates, preferably in a resin selected from among polyepoxides and polyvinyl esters.

As an example, the epoxy resin may be obtained from a base composition comprising epoxide monomers of the diglycidyl bisphenol A ether and of a hardener composition comprising phenols or acid or amine anhydrides. The polyvinyl ester resin may be obtained from a base composition comprising unsaturated polyesters and a hardener composition comprising vinyl monomers, such as styrene monomers.

According to an embodiment, one of the two components contained in a shell appears as a powder. In this case, the component contained in the other shell appears as a liquid.

Preferably, in the case when one of the components is a base composition and the other component is a hardener composition, the base composition is in the form of a powder, the hardener composition then being in liquid form.

The mixing of the components is carried out by the natural migration properties. Therefore, the mixing of the components may be accomplished without any mechanical stirring.

In order to accelerate the mixing, one of the two components may appear in powder form in order to add to the migration a capillarity property.

The cross-linking of the mixture of the components may last from 10 minutes to 10 hours, preferably from 20 minutes to 5 hours, still preferably from 30 minutes to 2 hours.

The seal according to the invention may appear either in a form in which the shells are separate, or in a form in which the shells are attached to each other, or in an intermediate form where the shells are partly attached to each other.

According to an embodiment, the shells are attached to each other, for example by welding.

The welding is preferably carried out at the membrane of each shell. Indeed, the sealing film of each shell should preferably remain "free", without any weld, in order to be able to break and to allow the contacting of the components.

Preferably, the welding is carried out by vulcanization, by ultrasound or by adhesive bonding.

Preferably, the welding is carried out in such a way that under the action of a mechanical stress, the sealing films break in order to allow contacting of the components contained in the shells. Preferably, the components are maintained in the shells after the action of the mechanical stress. Preferably, there is no leak of resin out of the seal. Indeed, the resin obtained after cross-linking is preferably maintained in the seal according to the invention. Nevertheless, if overtime, after a more or less extended use of the battery, the seal is worn, for example if there is a breakage of the membrane of the shells, it is possible that the resin be in contact with the object to be wedged without this being detrimental to the wedging property.

When the mechanical stress is applied on the seal, the shells are preferably attached to each other.

The mechanical stress may occur during the assembling of the different generators within a battery. The mechanical stress may be crushing, compression or pressure.

The mechanical stress causes breakage of the sealing film of each shell.

Figure 3A:
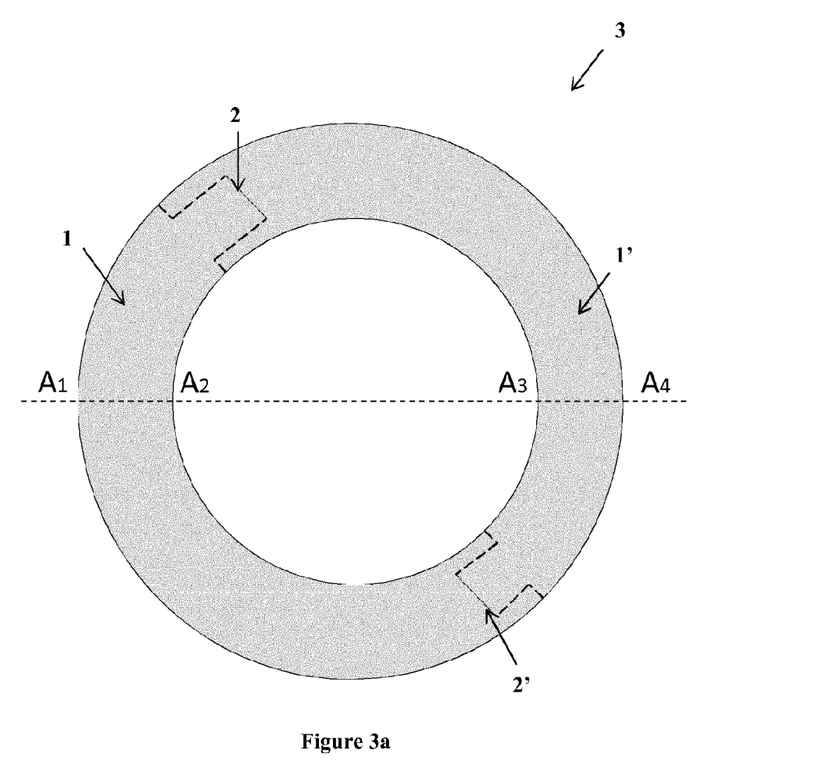
FIGS. 3a-3b schematically illustrates an embodiment of the seal according to the invention.
Figure 3B:
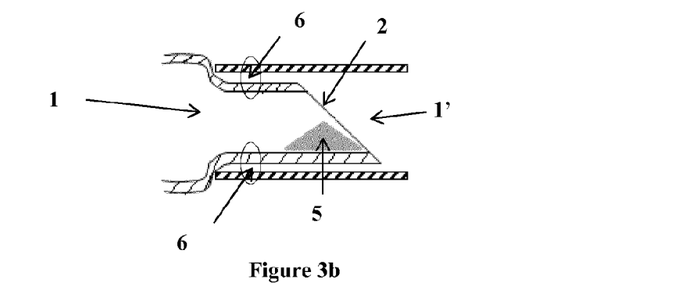

According to an embodiment, a breakage means is present within one or several shells of the seal, preferably in immediate proximity to the sealing film. The breakage means then gives the possibility of forcing the breakage of the sealing film when a stress is applied on the shell. FIG. 3*b* schematizes the presence of the breakage means 5 in a shell 1, for example in close proximity to a sealing film 2.

The seal according to present invention may be found in different forms.

According to an embodiment, the seal according to the invention appears as a ring (circle) having a certain thickness (see for example FIGS. 1*a*, 1*b*, 3, 4 and 5). Each shell then appears as a ring portion. The thickness may vary depending on the applications and on the use of the seal.

In the case when the seal consists of two shells, each shell preferably will appear as a half-ring having a certain thickness.

It is also possible to image a seal having a square profile (see for example FIGS. 1*c*, 1*d*, 2*a* and 2*b* upon which comments have been made below). In this case, the seal may then have the shape of a parallelepiped. In this case, the seal according to the invention is split into two portions or more in order to form the shells.

Figure 1A:
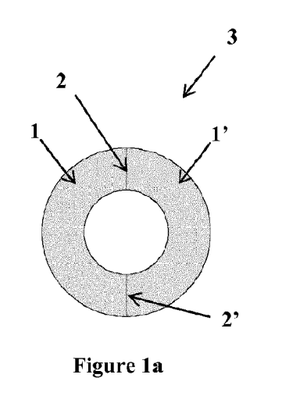
FIGS. 1a-1d illustrates sectional views according to several embodiments of the seal according to the invention.
Figure 1B:
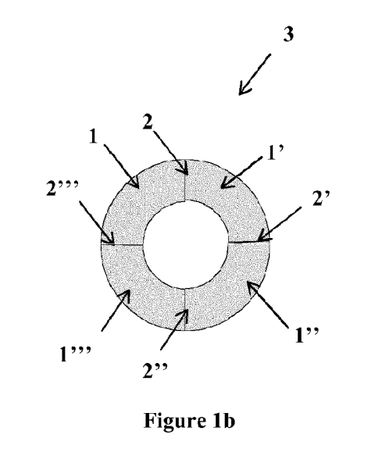
Figure 1C:
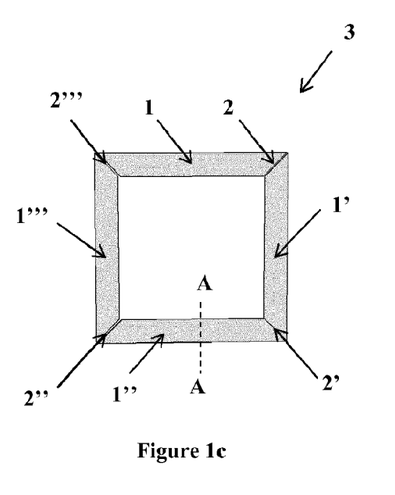
Figure 1D:
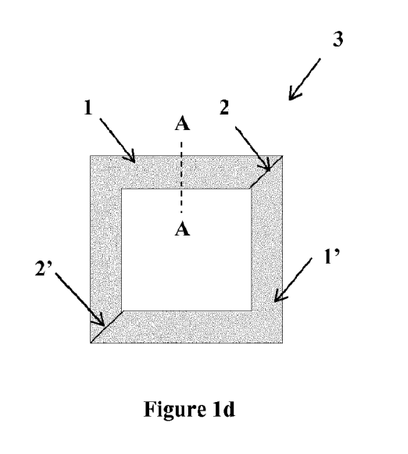
Figure 2A:
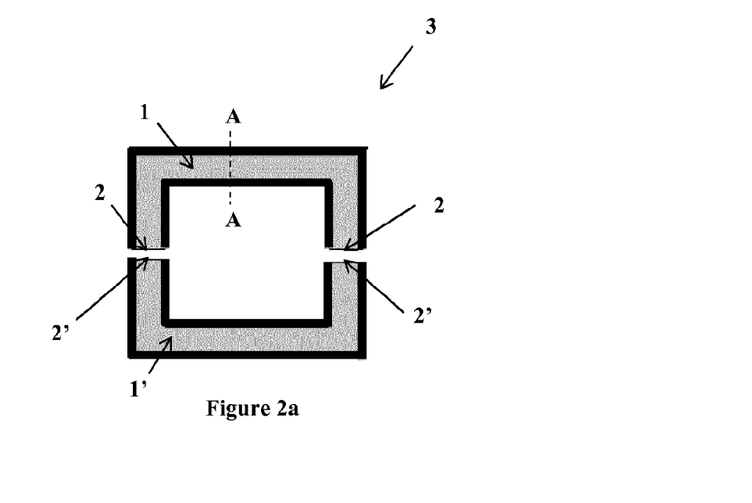
FIGS. 2a-2b illustrates sectional views according to several embodiments of the seal according to the invention.

In the case when the seal consists of two shells, each shell will preferably appear as a bent cylinder, having one or two bends (see for example FIGS. 1*d* and 2*a* respectively wherein along the section AA, a circular shape is obtained).

In the case when the seal consists of four shells, each shell will preferably appear as a straight cylinder having beveled ends, the four shells then forming a square or a rectangle (see for example FIG. 1*c* wherein along the section AA, a circular shape is obtained).

According to the embodiment in which the seal consists of 4 shells, preferably, 2 shells will contain the base composition and 2 shells will contain the hardener composition. According to this embodiment, preferably an alternation between a base composition and a hardener composition will be obtained, the base and hardener compositions being separated by fragile sealing films. Thus, the contacting and therefore the mixing of the base composition and of the hardener composition are facilitated since each base composition, hardener composition respectively, will have a shorter distance to cover in order to be mixed with the hardener, base respectively composition.

According to an embodiment, the seal according to the invention has an empty space between the shells.

The empty space may then be used for receiving the object to be wedged. In the case when the object to be wedged has a cylindrical shape, the empty space will preferably have the shape of a disc. In the case when the object to be wedged has a parallelepiped shape, the empty space will preferably have the shape of a square or of a rectangle.

As explained above, the seal according to the invention may appear in different forms. In particular, the shells may have different shapes. The figures are intended to give a few non-limiting examples of possible shapes for the shells of the seals according to the invention.

FIG. 1 illustrates sectional views of seals according to the present invention.

FIGS. 1a and 1b illustrate a seal 3 with a ring-shaped profile and FIGS. 1c and 1d illustrate a seal 3 with a square profile.

The seals of FIGS. 1a, 1b, 1c and 1d have an empty space between the shells.

FIGS. 1a and 1d illustrate a seal 3 consisting of two shells 1 and 1'. According to the embodiment of FIG. 1a, both shells 1 and 1' have the shape of a half-ring. According to the embodiment of FIG. 1d, both shells 1 and 1' have the shape of a half-rectangle each having a bend.

According to the embodiment of FIG. 1a and of FIG. 1d, both shells 1 and 1' are separated by two "planar" sealing films 2 and 2'.

Each shell 1 and 1' comprises a component and when there is breakage of the sealing films, the components are contacted, mixed together and cross-linked in order to give a cross-linked resin.

FIGS. 1b and 1c illustrate a seal 3 consisting of four shells 1, 1', 1" and 1'". According to the embodiment illustrated in FIG. 1b, the four shells 1, 1', 1" and 1'" have the shape of a quarter-ring. According to the embodiment illustrated in FIG. 1c, the four shells have the shape of a quarter of a rectangle.

According to the embodiment of FIG. 1b and of FIG. 1c, the four shells are separated by four "planar" sealing films 2, 2', 2" and 2'".

Each shell 1, 1', 1" and 1'" comprises a component and when there is breakage of the sealing films, the components are contacted, are mixed and cross-linked in order to give a cross-linked resin.

Preferably, the components of the shells 1 and 1" are identical and the components of the shells 1' and 1'" are identical. Indeed, this gives the possibility that the component of the shell 1 may react with the component present in the shells 1' and 1'" in order to crosslink. In the same way, the component of the shell 1" may then react with the component present in the shells 1' and 1'" in order to crosslink. Thus, according to this embodiment, the cross-linking time will be reduced in so far that the components will have less distance to cover for mixing together and cross-linking.

Figure 2B:
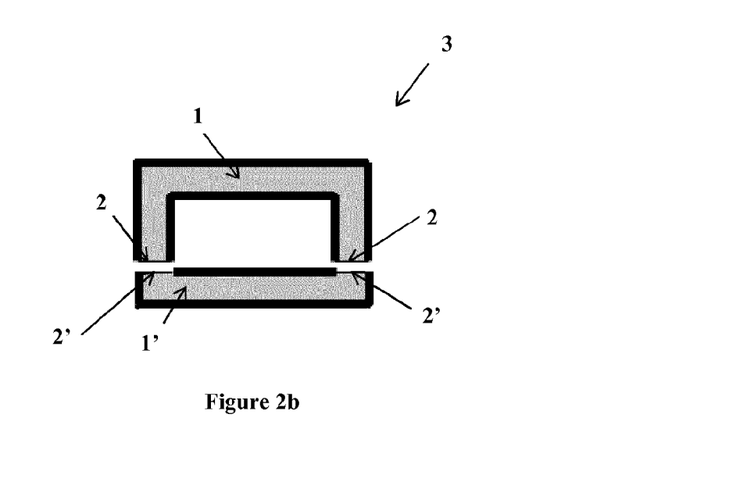

FIG. 2 illustrates other embodiments of seals according to the invention. Like for FIG. 1, FIG. 2 illustrates the sectional views.

In FIG. 2, the thicker lines illustrate the (solid) membrane of the shells and the thinner lines illustrate the sealing film (fragile) 2 and 2' of the shells.

According to the embodiment of FIG. 2a, the seal 3 comprises 2 shells 1 and 1', each shell having the shape of a half-rectangle each comprising two bends.

Preferably, the shells have the same shape. In particular, when the shell comprises an even number of shells, it is preferable that all the shells have the same shape.

Nevertheless, it is possible to contemplate a seal comprising at least two shells of different shapes, as illustrated in FIG. 2b.

According to the embodiment of FIG. 2b, the seal 3 comprises 2 shells 1 and 1', the shell 1 having the shape of a U, and the shell 1' having the shape of a rectilinear portion of a rectangle, able to close the U when the shells are welded.

Before their use as a wedging means, the shells are preferably attached to each other, for example through a weld. The shells are welded so that when a mechanical stress is applied, the breakage of the sealing films of the shells allows the components contained in each shell to be contacted with each other, the components being maintained in the structure of the shells after opening the sealing films for ensuring adequate cross-linking, without any component loss.

According to an embodiment of the invention, each shell comprises an end having a male portion and an end having a female portion, the male portion of the end of a shell being inserted into the female portion of the end of another shell. FIG. 3 illustrates this embodiment in which the seal 3 consists of two shells and the shells are ring-shaped.

In FIG. 3a (sectional view), both shells 1 and 1' are welded to each other so that the components are maintained inside the shells, even after breakage of the sealing films 2 and 2'.

In FIG. 3b, is illustrated a sectional view of the junction comprising the sealing film 2 of FIG. 3a. In FIG. 3b, the end of the shell 1 has a male portion which is inserted into the female portion of the end of the shell 1'.

According to the embodiment illustrated on the diagram of FIG. 3, the shells 1 and 1' are first closed at one end by setting into place a sealing film 2 and 2', and then they are each filled with a component before being assembled to each other in order to form the seal according to the invention.

According to this embodiment, the shells may also be attached to each other by welding.

In FIG. 3b, the circles 6 illustrate the portions of the shells 1 and 1' which may be welded for attaching the shells 1 and 1'.

Preferably, the end of the male portion is closed by the sealing film and the male portion comprises a means for breaking the sealing film.

FIG. 3b illustrates this embodiment wherein the breakage means is illustrated by a fin 5.

FIG. 4 illustrates a seal according to another embodiment of the invention. According to the embodiment illustrated in FIG. 4, the seal 3 comprises two shells 1 and 1' each having the shape of a half-ring split through its generatrix. FIG. 4d illustrates a perspective view of the seal 3, once both shells 1 and 1' have been attached to each other, for example by a weld illustrated by the lines 4 and 4'.

Figure 4A:
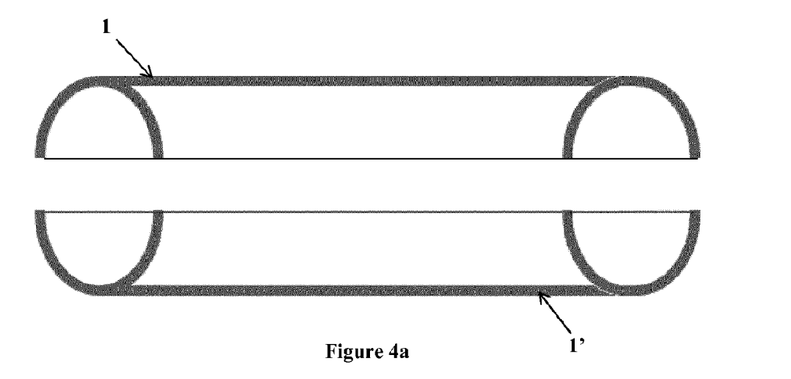
FIGS. 4a-4d schematically illustrates an embodiment of the seal according to the invention.
Figure 4B:
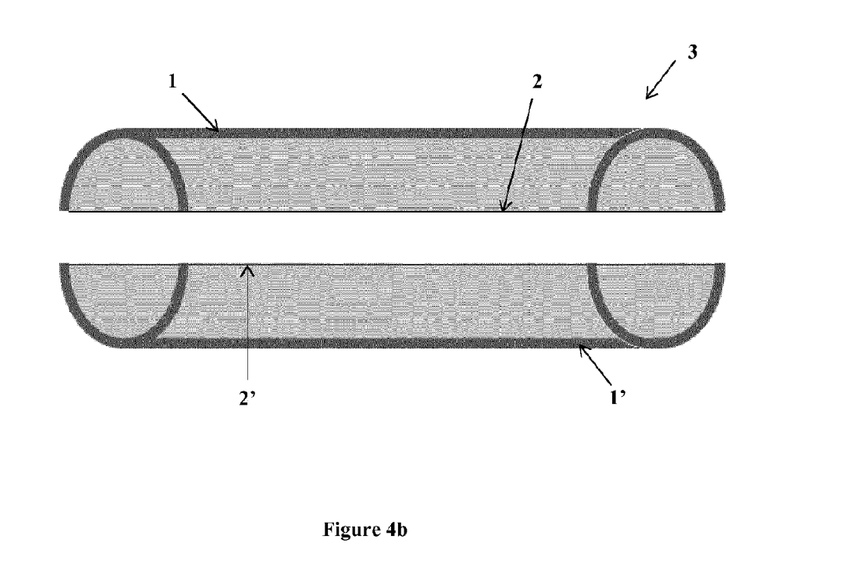
Figure 4C:
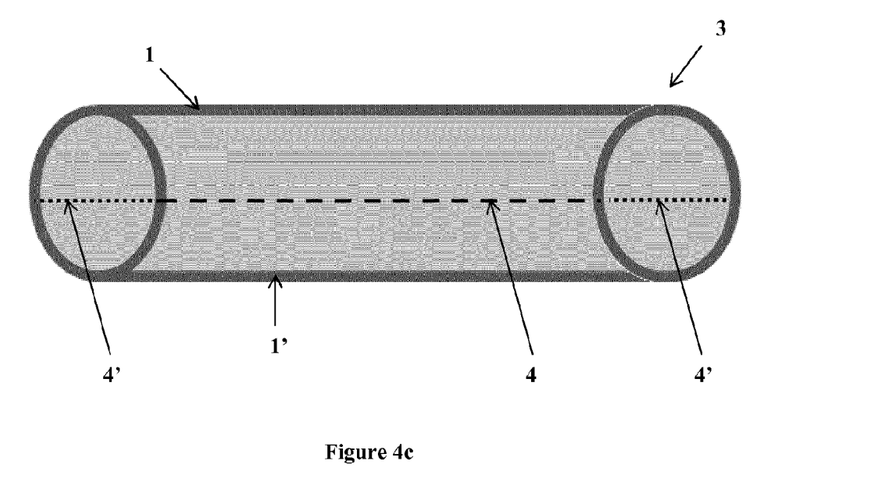
Figure 4D:
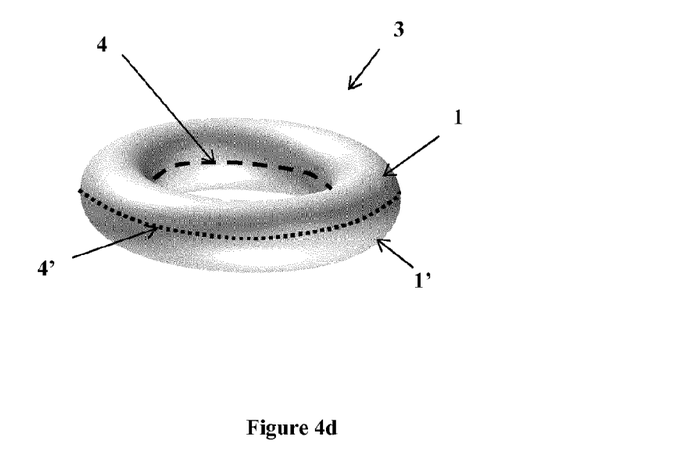

In FIGS. 4a, 4b and 4c, in order to facilitate understanding, the seal as illustrated in FIG. 4d has been fictitiously "cut" and laid down flat. In FIGS. 4a, 4b and 4c, the membrane of the shells 1 and 1' has been illustrated with a certain thickness.

FIG. 4a illustrates the shells 1 and 1' before filling with each component. FIG. 4b illustrates the shells 1 and 1' each comprising one component, the mixture of the components being able to crosslink. After filling the shells 1 and 1', each of both shells is closed with a sealing film 2 and 2', respectively. In FIG. 4c, both shells are attached to each other, for example by welding. The welding junction is carried out for example at the membrane, along the half-ring, for example through a welding line 4 at the internal diameter of the half-ring and a welding line 4' at the external diameter of the half-ring. The welding lines 4 and 4' have also been illustrated in FIG. 4d. Thus, when the seal 3 illustrated in FIG. 4c undergoes a mechanical stress, for example crushing, the sealing films 2 and 2' break and the components of the shells 1 and 1' are contacted, mixing together by migration and optionally by capillarity for cross-linking and obtaining a cross-linked resin. By means of the weld, the shells 1 and 1' remain attached to each other at the membrane of the shell, even after crushing the seal.

The invention also relates to a method for manufacturing the seal according to the invention, comprising the following steps:
a) providing at least two deformable shells,
b) filling each shell with a component,
c) setting into place at least one sealing film on each shell, the order of steps b) and c) may be reversed.

As indicated earlier, the deformable shells may have different shapes. The volume of each shell is adapted to the use of the seal.

Preferably, the filling is carried out through an aperture of the shell, this aperture may then be closed with a sealing film.

The filling of each shell may be carried out before or after the setting into place of a sealing film on each shell. The setting into place of at least one sealing film on a shell may correspond to the closing of an end of a shell before filling the shell through another end. As an example, FIG. 4 illustrates an embodiment wherein the filling is carried out before the setting into place of at least one sealing film, said setting into place closing the shell and then preventing escape of the component from the shell. On the contrary, FIG. 3 illustrates an embodiment wherein the filling is carried out after setting into place a sealing film on one end of the shell, the other end of the shell remaining open for allowing filling of the shell with a component.

Preferably, the component occupies at least 50% of the volume of the shell, preferably at least 75% of the volume of the shell, preferably at least 90% of the volume of the shell, still preferably the component occupies the totality of the volume of the shell.

According to an embodiment, the setting into place of at least one sealing film on each shell is carried out by hot sealing by means of a film.

According to an embodiment, the method for manufacturing the seal further comprises a step for welding the shells to each other, so that a breakage of the sealing film causes the contacting of the component contained in a shell with the component contained in another shell. The welding is preferably carried out at the membrane of the shells. Preferably, the welding is carried out by vulcanization, by ultrasound or by adhesive bonding.

After welding the shells, the shells are positioned so that the breakage of the sealing film causes the contacting of the component contained in one shell with the component contained in another shell to obtain cross-linking of the mixture of the components.

According to an embodiment of the manufacturing method, a breakage means is set into place in at least one of the shells of the seal, preferably in proximity to a sealing film. Preferably, the breakage means is set into place before filling the shell and before setting into place a sealing film on the shell.

The invention also relates to a wedging means obtained after cross-linking of the components contained in the seal according to the invention.

The components, preferably the composition of the base and the composition of the hardener, are contacted and therefore cross-link, during the application of a mechanical stress. A resin is obtained after cross-linking the mixture of the components.

The wedging means refers to the seal in which the mixture of the components has cross-linked, in other words, the wedging means refers to the stiffened seal.

During the cross-linking, the resin hardens. At the end of the cross-linking, the seal is deformed and rigid. Thus, after assembling the generators of a battery, the wedging means (or rigid deformed seal) gives the possibility of wedging an electrochemical generator within a battery.

The wedging means according to the invention has many advantages, notably that of adapting to different designs (or formats) of the electrochemical generators and that of being robust and of resisting to thermal fluctuations.

The invention also relates to the use of the seal according to the invention for wedging an electrochemical generator in the battery tray. The seal according to the invention may be placed at the bottom of a battery tray or else on a mechanical supporting element itself laid on the bottom of the tray, and the electrochemical generator may be placed on the seal.

The weight of the electrochemical generator causes crushing of the seal. The pressure causing the crushing of the seal may also be exerted by a device in addition to the weight of the electrochemical generator, for example by setting into place the lid of the battery tray. Under the effect of this mechanical stress, the sealing films separating the components contained in the shells break within the seal, which causes the contacting of the components and therefore the cross-linking of the mixture of the components. At the end of the cross-linking, the resin is hard, which allows the wedging means (seal according to the invention after cross-linking) of ensuring its role.

The seal according to the invention is used as a means for wedging but does not act as a means for adhesively bonding. Indeed, the resin, after hardening, is maintained in the shells forming the seal. However, upon wear, after a certain time of use of the battery, it is possible that the membrane of the shells breaks without this being detrimental to the wedging property. In the case of breakage of the membrane, the resin will then be in direct contact with the electrochemical generator to be wedged.

Each generator comprises a container containing:
a) an electrochemical bundle, i.e. the assembly formed by the alternation of positives and negative electrodes separated by a separator;
b) a liquid electrolyte.

The container is preferably of a cylindrical shape but other formats may be contemplated such as the parallelepiped format (prism). The container has a wall at one of its ends resting on a supporting surface. The container of the electrochemical generator is closed at the opposite end by a lid supporting the current output terminals. One of the two terminals may be attached on the external wall of the lid and electrically connected to the cylindrical wall of the container. The other terminal may be attached through the lid and electrically insulated from the lid by a seal in a plastic material.

The supporting surface may be the bottom of the battery tray or a mechanical supporting element such as a flange, said mechanical supporting element being itself laid on the bottom of the battery tray. The mechanical supporting element gives the possibility of avoiding direct contact of the electrochemical generator with the bottom of the battery tray. The supporting element notably allows electric insulation of the electrochemical generator. The supporting element may for example be a flange.

Figure 5A:
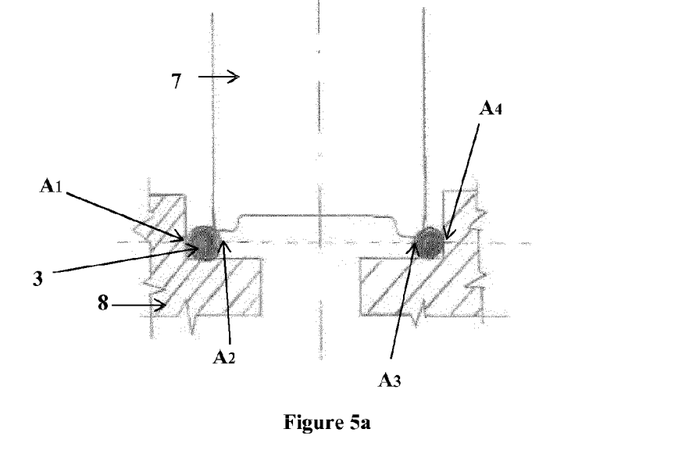
FIGS. 5a-5b illustrates the use of the seal according to the invention for wedging an object, such as an electrochemical generator.
Figure 5B:
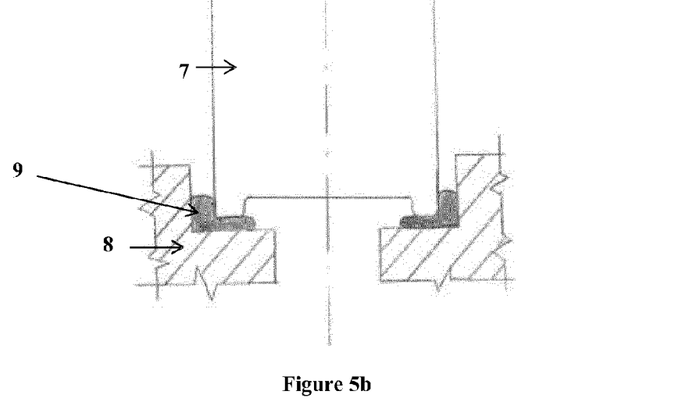

FIG. 5 illustrates the use of a seal according to the invention, use of a seal as illustrated in FIG. 3 or in FIG. 4. This is a longitudinal sectional view, along the generatrix of the electrochemical generator of a cylindrical shape in the case of FIG. 5. On the embodiment of FIG. 5, the seal is ring-shaped. The seal according to the invention then has an empty space in the middle of the ring. The electrochemical generator 7 is laid on the ring, the empty space at the center of the ring having a size substantially identical with the diameter of the container (of cylindrical shape). The container of the generator has a bottom which rests on the seal. During the assembling, the seal according to the invention undergoes a mechanical stress. FIG. 5a illustrates the rest state, i.e. before applying a mechanical stress, the seal 3 is laid on a supporting surface 8, such as mechanical supporting element, for example a flange, itself laid on the bottom of the battery tray, the electrochemical generator 7 is laid on the seal 3. The axis A1 A2 A3 A4 as defined in FIG. 4a has been transferred onto FIG. 5a for facilitating the reading of FIG. 5a. In FIG. 5, the supporting surface 8 for example schematizes a mechanical supporting element and the side wall of the tray. As explained earlier, the action of the mechanical stress causes mixture of the components contained in each shell which leads to the expansion of the resin. As illustrated in FIG. 5b, after hardening of the resin, the seal is deformed since the resin has been distributed into the available spaces and a wedging means 9 is obtained. This wedging means fills the empty spaces and ensures wedging of the electrochemical generator in the battery tray. The shape of the seal according to the invention guarantees rigid wedging of the container of the generator over the whole of its periphery, as well as on the periphery of its supporting surface on the bottom of the container and therefore orthogonal to the vertical axis described in FIG. 5.

Because of its shape and of its position on the container, the invention ensures wedging/blocking of the electrochemical generator with respect to the tray, systematically in both the axial and radial direction tray, regardless of the shape of the electrochemical generator, whether it is cylindrical or parallelepipedic.

Further, the recessed shape of the seal gives the possibility of clearing a space for an optional security system of the electrochemical generator, located on the bottom of the container. The space corresponding to the recess of the seal gives the possibility of receiving gases from the container of the generator in the case of triggering of the security system.

The invention also relates to a method for assembling a battery comprising at least one electrochemical generator, said method comprises the following steps:
  making available a tray comprising a supporting surface,
  setting into place at least one seal according to the invention in the tray in contact with the supporting surface,
  setting into place at least one electrochemical generator in contact with the seal,
  breaking the sealing films and contacting the components contained in the shells of the seal under the action of the mechanical stress exerted by the electrochemical generator,
  stiffening of the seal.

The supporting surface may be the bottom of the battery tray or a mechanical supporting element such as a flange, said mechanical supporting element being itself laid on the bottom of the battery tray. The mechanical supporting element gives the possibility of avoiding that the electrochemical generator be in direct contact with the bottom of the battery tray. The supporting element notably allows electric insulation of the electrochemical generator. The supporting element may for example be a flange.

According to an embodiment of the assembling method, the seal has a shape adapted to the shape of the generator. In particular, the seal may have an empty space between the shells, said empty space then having the same shape as the shape of the generator. In this case, the seal will be present all around the electrochemical generator.

According to an embodiment, the assembling method comprises the following steps:
  making available a tray comprising a bottom,
  setting into place at least one seal according to the invention in the tray,
  setting into place at least one electrochemical generator in contact with the seal,
  breaking the sealing films and contacting the components contained in the shells of the seal under the action of the mechanical stress exerted by the electrochemical generator,
  stiffening of the seal.

According to an embodiment, the assembling method comprises the following steps:
  making available a tray comprising a bottom,
  setting into place at least one mechanical supporting element at the bottom of the tray,
  setting into place at least one seal according to the invention on the supporting element,
  setting into place at least one electrochemical generator in contact with the seal,
  breaking the sealing films and contacting the components contained in the shells of the seal under the action of the mechanical stress exerted by the electrochemical generator,
  stiffening of the seal.

Another object of the present invention relates to a battery comprising at least one electrochemical generator and at least one wedging means according to the invention. The wedging means according to the invention corresponds to the seal of the invention after cross-linking. Indeed, when the battery is assembled, the seal is subject to a mechanical stress so that the mixture of the components contained in the shells of the seal has cross-linked. In other words, at the end of the cross-linking, the seal has been stiffened so as to lead to the wedging means.

Preferably, the battery comprises a seal according to the invention per electrochemical generator. In other words, each electrochemical generator contained in the battery is preferably wedged by means of a seal according to the invention.

According to an embodiment, a mechanical supporting element, such as a flange, is laid on the bottom of the battery tray; the presence of the mechanical supporting element avoids direct contact between the bottom of the battery tray and the container of the electrochemical generator(s).

According to an embodiment, the electrochemical generator used in the battery according to the invention is a based on lithium-type generator.

Another object of the present invention relates to a method for assembling a battery comprising at least one electrochemical generator, said method comprising the steps:
  making available a tray comprising a bottom,
  setting into place in the tray of at least one seal capable of being stiffened,
  the setting into place of at least one electrochemical generator in contact with the seal,
  the stiffening of the seal under the action of the mechanical stress exerted by the electrochemical generator.

It is possible to contemplate the use of a seal capable of being stiffened for wedging an electrochemical generator in the battery tray. It is actually conceivable to obtain a stiffening effect of the seal without resorting to the use of two components, such as the base composition and the hardener composition, including the cross-linked mixture.

Just like the seal according to the invention, the seal able to be stiffened which is used in the second method for assembling a battery has a flexible structure at rest, before applying a mechanical stress. The flexible structure gives the possibility of filling the empty spaces. Next, after applying a mechanical stress, the seal stiffens so as to give the possibility of obtaining a wedging which is of good quality, in particular which is robust.

One of the advantages of the invention is that it allows disassembling of the electrochemical generators of the tray subsequently if need be. Indeed, even if overtime the shell of the seal breaks, there will not be any possible adhesion between the container of the electrochemical generator and the seal because of the fact that the resin has cross-linked beforehand. This gives the possibility of ensuring that the generators may be easily withdrawn from the tray.

According to an embodiment, the assembling method comprises:
- making available a tray comprising a bottom,
- setting into place at least one supporting element at the bottom of the tray,
- setting into place on the supporting element at least one seal able to be stiffened,
- setting into place of at least one electrochemical generator in contact with the seal,
- the stiffening of the seal under the action of the mechanical stress exerted by the electrochemical generator.

EXAMPLES

The tested seals are ring-shaped seals as illustrated in FIG. 3. The method for manufacturing the seal according to the invention is the following:
- Manufacturing of two shells having a membrane in synthetic rubber having a thickness of 0.50 mm, by injection in a mold; each of the two shells has a half-ring shape as illustrated in FIG. 3a,
- Laying a sealing film in synthetic rubber having a thickness of 0.10 mm, on one end of each shell,
- Sealing the sealing film by induction,
- Filling a shell with a base composition comprising epoxide monomers of the diglycidyl ether type of bisphenol A and filling of the other shell with a hardener composition comprising phenols; the base composition and the hardener composition are such that the base composition represents 78% by mass (i.e. a mass of 2.34 grams of base composition) and the hardener composition represents 22% by mass (i.e. a mass of 0.66 grams of hardener composition), the percentages being expressed based on the sum of the masses of both compositions,
- Assembling both shells by a fitting such as illustrated in FIG. 3b followed by vulcanization at the membrane of each shell.

The Applicant measured the mass of injected resin and the mass of seals required for ensuring wedging of the generators within three types of batteries. The values are indicated in table 1 below.

TABLE 1 measurement of the mass of the injected resin and of the mass of seals

|  | Comparative: Injected resin mass (g) | According to the invention: Mass of seals (g) | Mass reduction (%) |
| --- | --- | --- | --- |
| Battery A | 1300 | 42 | 3136 |
| Battery B | 330 | 21 | 1592 |
| Battery C | 610 | 42 | 1472 |

The injected resin is an epoxy foam (expansive resin) comprising flame-retardant fillers. The resin is comprised in the whole volume of the tray, along the electrochemical generators.

The battery A comprises a parallelepiped tray of dimensions 280×290×270 mm (Length×width×height) and 14 electrochemical generators. Each electrochemical generator is of a cylindrical shape and has a diameter of 54 mm and a height of 222 mm. The free volume intended to receive the resin is 5 liters, the volume occupied by the electrochemical generators is 7.11 liters. A seal according to the invention per generator will be necessary for ensuring satisfactory wedging. The battery A therefore comprises 14 seals according to the invention.

The battery B comprises a cylindrical tray of dimensions of 294 mm in height for a diameter of 179 mm. The battery B comprises 7 electrochemical generators. Each electrochemical generator is of a cylindrical shape and has a diameter of 54 mm and a height of 222 mm. The free volume intended to receive the resin is of 1.22 liters, the volume occupied by the electrochemical generators is 3.55 liters. One seal according to the invention per generator will be necessary for ensuring satisfactory wedging. The battery A therefore comprises 7 seals according to the invention.

The battery C comprises a parallelepiped tray of dimensions 445×126×292 mm (Length×width×height) and 14 electrochemical generators. Each electrochemical generator is of a cylindrical shape and has a diameter of 54 mm and a height of 222 mm. The free volume intended to receive the resin is 1.5 liters, the volume occupied by the electrochemical generators is 7.11 liters. One seal according to the invention per generator will be necessary for ensuring satisfactory wedging. The battery A therefore comprises 14 seals according to the invention.

By comparing the masses, it is realized that the use of a seal according to the invention for wedging electrochemical generators gives the possibility of considerably decreasing the mass of the final obtained battery.

The Applicant also compared two wedging methods of the prior art (wedging with a foam matrix and wedging with a flat elastomeric ring) with the wedging method according to present invention with the seal according to the invention (see table 2).

The foam is a flame-retardant epoxy foam as used above for the batteries A, B and C.

The seal according to the invention used for the tests of table 2 comprises a silicone shell.

The elastomeric ring is a flat silicone ring (silicone with 40-60 Shore hardness).

In order to accelerate the cycles of environmental stresses, the batteries comprising a different type of wedging were subject to the RTCA DO-160G or ISO 13628-6 standard.

Different properties were measured:
i) Mechanical hold, corresponding to the capability of a product, because of its assembling, of withstanding mechanical stresses without any degradation of its performances, it is evaluated by comparing the eigenfrequencies of the system with the mechanical stress frequencies; a good mechanical hold for example corresponds to an eigenfrequency of the system of 500 Hz for a mechanical stress frequency ranging from 0 to 200 Hz;

ii) Thermal cycling, consists in a more or less significant temperature change and to a given frequency over a given period, according to the requisites of the application and this in order to reproduced in a laboratory the temperature changes, which the product will undergo in its operational environment;

iii) Ageing: a product subject to environmental aggressions like thermal cycling, mechanical stresses, exposure to UVs, saline atmosphere, presence of water, which accelerate degradation of the performances of the materials making up the product and therefore of the intrinsic performances of the product.

TABLE 2

Evaluation of the properties obtained for different wedging solutions

|  | Wedging with a foam matrix | Wedging with a flat elastomeric ring | Wedging according to the invention |
|---|---|---|---|
| Mechanical hold | ++ | − | ++ |
| Thermal cycling | − | + | + |
| Ageing | + | + | ++ |
| Weight gain | − | + | + |

Table 2 above collects the results which were obtained for each property by using a same battery but different wedging solutions. The weight gain was also evaluated for the three wedging solutions.

The sign "−" corresponds to the worst performance and the sign "++" corresponds to the best performance. The sign "+" corresponds to an intermediate performance.

Table 2 indicates that the wedging with a foam matrix gives a mechanical hold equivalent to that of the wedging according to the invention but a poorer thermal cycling than the wedging according to the invention.

Table 2 indicates that the wedging with an elastomeric ring gives thermal cycling equivalent to that of the wedging according to the invention but the wedging according to the invention has better mechanical hold than the wedging with an elastomeric ring.

Indeed, the stiffening of the seal according to the invention gives the possibility of significantly improving the mechanical hold properties as compared with an elastomeric ring which will remain flexible.

The seal according to the invention is based on its efficiency exclusively on wedging and not on adhesive bonding. Indeed, the adhesive bonding is more subject to temperature changes than the wedging. Indeed, the difference in the thermal expansion coefficient between a foam and the mechanical parts to be wedged generates a shearing phenomenon which fatigues the adhesive bonding interface and tends to separate the foam from the mechanical part.

Of course, the present invention is not limited to the examples and to the embodiments described and illustrated, but many alternatives thereof are accessible to one skilled in the art.

The invention claimed is:

1. A battery comprising at least one electrochemical generator and at least one wedging means for wedging said electrochemical generator in the battery, said wedging means being obtained after crosslinking of the components of a seal, said seal comprising at least two deformable shells wherein each shell contains a component and comprises a sealing film and wherein contact of the component contained in one shell with the component contained in another shell causes cross-linking of a mixture of both components, said electrochemical generator comprising a container including a bottom, the bottom of the container being in contact with the seal.

2. The battery according to claim 1, wherein the component contained in the one shell is a base composition and the component contained in the other shell is a hardener composition, the base composition and the hardener composition being the components of a two-component adhesive.

3. The battery according to claim 1, wherein the shells are attached to each other by welding.

4. The battery according to claim 3, wherein the shells are attached to each other by vulcanization, by ultrasound or by adhesive bonding.

5. The battery according to claim 1, wherein the contact of the components contained in each shell is carried out after breaking the sealing films of each shell.

6. The battery according to claim 1, wherein under the action of a mechanical stress, the sealing films break and the components contained in each shell are contacted to obtain the cross-linking.

7. The battery according to claim 1, wherein the cross-linking of the components results in a resin selected from among polyepoxides, polyvinyl esters, polyacrylics, polyacrylates or mixtures thereof.

8. The battery according to claim 1, wherein the seal has an empty space between said shells.

9. The battery according to claim 1, wherein the seal has the shape of a ring in which each shell represents a portion of the ring.

10. The battery according to claim 9, wherein the seal consists of two shells, each of the two shells having the shape of a half-ring.

11. The battery according to claim 1, wherein each shell comprises an end having a male portion and an end having a female portion, the male portion of the end of one of the shells being inserted into the female portion of the end of another shell.

12. The battery according to claim 11, wherein the end of the male portion is closed by a sealing film and the male portion comprises a means for breaking the sealing film.

13. A method for assembling a battery comprising at least one electrochemical generator, said method comprising the following steps:
  making available a tray comprising a supporting surface,
  setting into place at least one seal in the tray in contact with the supporting surface, said seal comprising at least two deformable shells, each shell containing a component and comprising a sealing film, wherein contact of the component contained in one shell with the component contained in another shell causes cross-linking of a mixture of both components,
  setting into place at least one electrochemical generator comprising a container including a bottom, the bottom of the container being in contact with the seal,
  breaking the sealing films and contacting the components contained in the shells of the seal under the action of the mechanical stress exerted by the electrochemical generator, and
  stiffening of the seal.

* * * * *